Dec. 19, 1933.  J. KELSEY  1,939,781
PIVOTED AND SLIDING CASEMENT
Filed Oct. 27, 1931  3 Sheets-Sheet 1
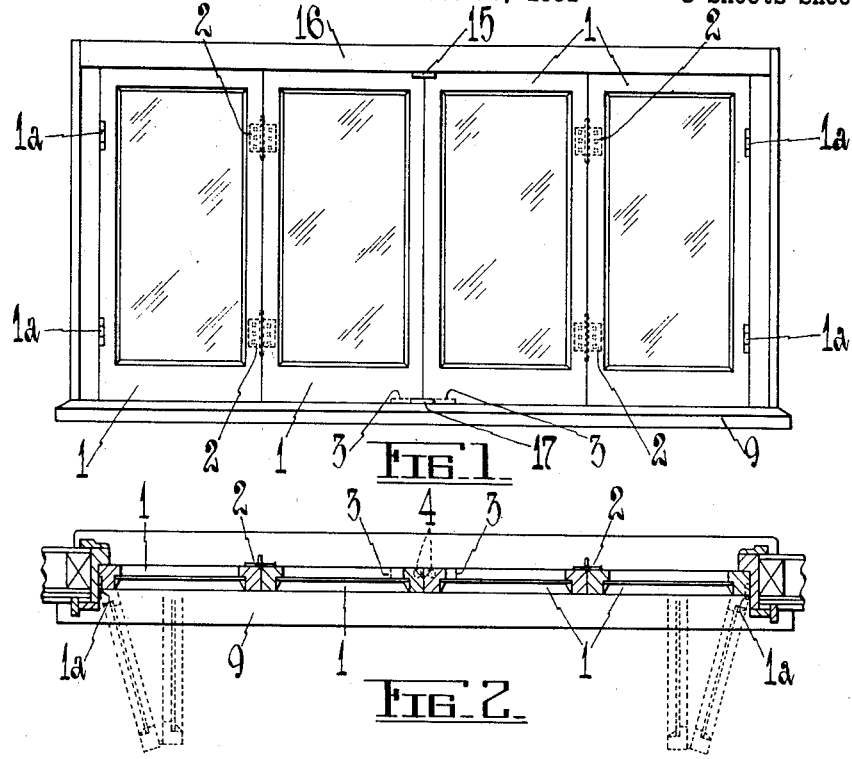
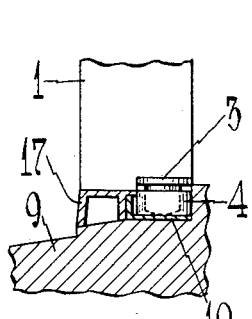
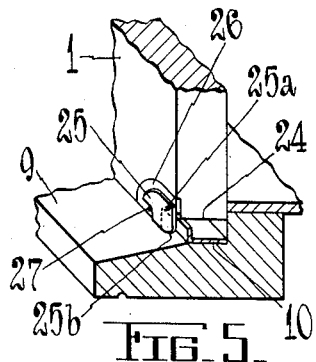
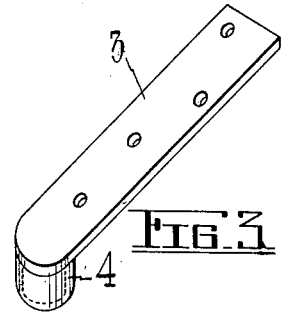
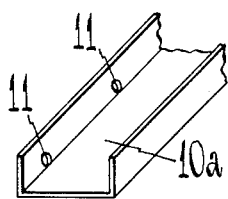
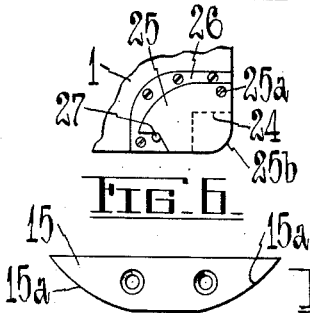
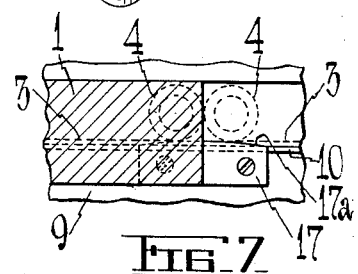
Inventor:
J. Kelsey Dec. 19, 1933.  J. KELSEY  1,939,781
PIVOTED AND SLIDING CASEMENT
Filed Oct. 27, 1931   3 Sheets-Sheet 2
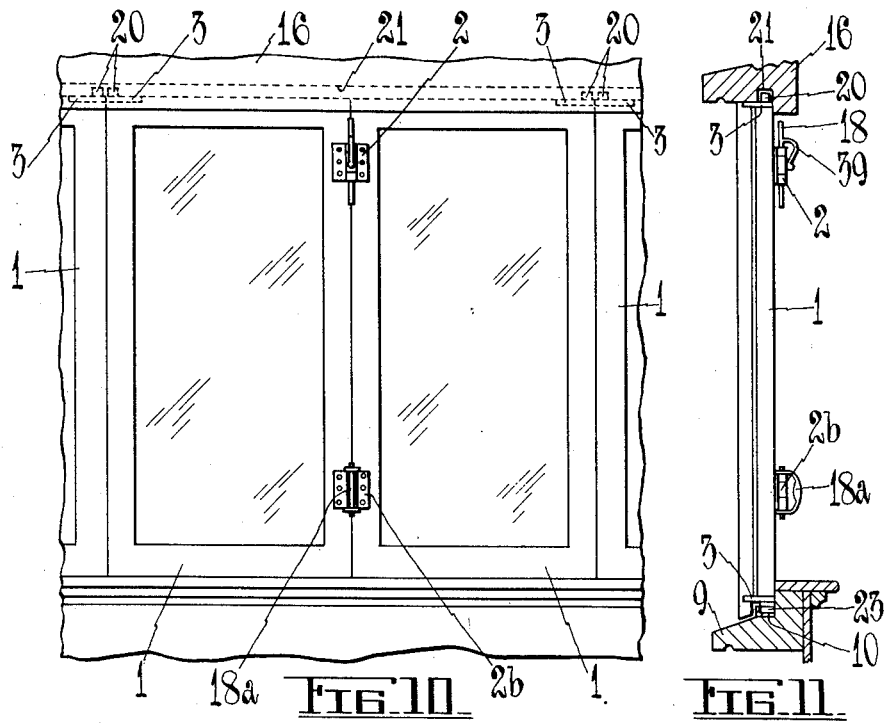

Dec. 19, 1933.   J. KELSEY   1,939,781
PIVOTED AND SLIDING CASEMENT
Filed Oct. 27, 1931   3 Sheets-Sheet 3
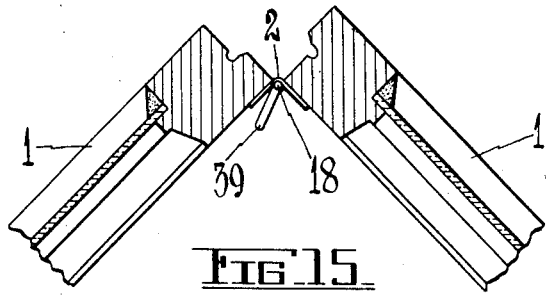
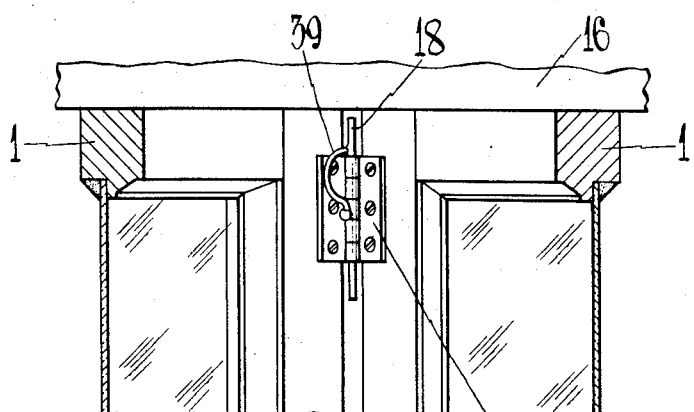
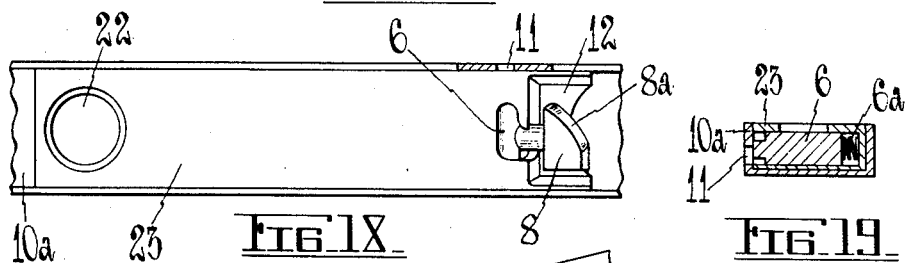
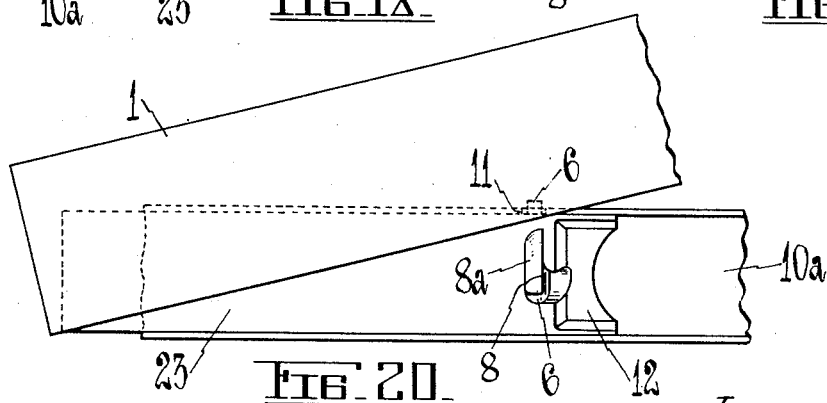
Inventor:
J. Kelsey
by C. F. Wendroth
Atty Patented Dec. 19, 1933

1,939,781

UNITED STATES PATENT OFFICE 1,939,781

PIVOTED AND SLIDING CASEMENT

John Kelsey, Auckland, New Zealand

Application October 27, 1931, Serial No. 571,390, and in New Zealand November 27, 1930

8 Claims. (Cl. 20—42)

This invention relates to windows of the kind wherein sashes hinged together in pairs, are also pivotally and slidably mounted between the head and the sill of a window-frame, the opening of the window being performed by moving the inner or hinged together members of the sashes outwards from the frame, which action slides the outer sash members along the window frame towards each other, the window being closed by moving the hinged together sash members inwards, to cause the sashes to spread and close the window opening.

The invention provides improvements in the fittings used on and in conjunction with sashes mounted as above described, said improvements being comprised in the fittings provided at the outer upper and lower corners of pairs of sashes and which operate in guides in the window frame head and on the window sill, in the hinges connecting the sashes together, in the means for locking the sashes in their closed positions, in the sashes themselves, in the provision of means for causing the sashes to be held tightly in the window frame when closed and in the guides in which the lower fittings of the sashes operate.

The aforesaid and other improvements are illustrated in the accompanying drawings, and will be described in conjunction therewith, and wherein Fig. 1 is an outside elevation, and Fig. 2 a sectional plan view of a window fitted with some of the improvements and showing the outer sashes of pairs thereof hinged to the window frame;

Fig. 3 a perspective view of the fitting used at the lower outer corner of a pair of hinged together sashes, Fig. 4 a part cross sectional view showing the fitting used in Fig. 3 entered in the track on the sill, Fig. 5 a part perspective view of a sash showing a pivoted cover plate used thereon;

Fig. 6 a part elevation of said sash and said plate,

Fig. 7 a part sectional plan view showing the fitting with the curved surface thereon used on the window sill;

Fig. 8 a part perspective view of a channelled track;

Fig. 9 an inverted plan view of the fitting with the curved surface thereon used on the head of the window frame;

Fig. 10 an inside elevation,

Fig. 11 a cross sectional elevation, and

Fig. 12 a part sectional plan view of a window fitted with further improvements, and wherein the sashes are also slidable in the window frame;

Fig. 13 a detail view in sectional elevation showing the fitting used at the lower outer corner of a sash (shown in Figs. 10 to 12) inserted in a member slidable in the guide track;

Fig. 14 a perspective view in section of the sliding member shown in Fig. 13,

Fig. 15 a part sectional plan, and

Fig. 16 a part elevation showing a hinge, the pin of which can be used for locking the sashes in their closed positions;

Fig. 17 an elevation of an improved form of bolt,

Fig. 18 a plan view,

Fig. 19 a cross sectional view of a modified form of sliding fitting used in the guide track and fitted with a locking device, Fig. 20 a similar view to Fig. 18 showing the handle or finger piece of the locking device raised and about to be engaged by a sash, Fig. 21 an inverted plan view of the fitting used at the lower outer corners of the sashes, in Figs. 10 to 12, and Fig. 22 a perspective view broken, of the fitting used at upper outer corners of the sashes in Figs. 10 to 12.

Referring to the invention as illustrated in Figs. 1 and 2, where the sashes 1 are hinged together at 2 in pairs and where the said pairs are hinged at 1ª to the window frame the lower outer corner of each pair of sashes has recessed thereinto a plate 3 (Figs. 3 and 4) carrying a roller 4 which runs in a guide track formed by a metal strip 10 of a right angle cross section and the window sill 9. An alternative form of guide track for the rollers 4 can be provided by a metal strip 10ª (Fig. 8) of channel cross section. Both the right angle metal strip 10 and the channel metal strip 10ª are provided with holes 11 for the escape of water from the guide track.

Where the pairs of hinged together sashes 1 meet when closed, a fitting 15 (Figures 1 and 9) formed with curved surfaces 15ª thereon, is secured to the head 16 of the window frame, the sashes 1 when fully closed being forced into contact with said curved surfaces 15ª, similarly a fitting 17 (Figs. 1, 4 and 7) with a curved surface 17ª is secured on the sill 9, over the front edge of the strip 10 or 10ª so as to be engaged by the rollers 4 of meeting sashes 1 when the latter are closed. The fittings 15 and 17 are provided to ensure the sashes 1 being tightly held when closed and have the effect of wedging said sashes in the window frame.

The pairs of sashes 1 instead of being hinged to the window frame, can be slidable as a whole along the latter, in which case there is a plate 3 recessed in each lower outer corner of each pair of hinged together sashes 1 (Figs. 10 and 11). Also when the sashes 1 are also slidable along the window frame, each upper outer corner of a pair of hinged together sashes also has a plate 3 recessed therein, the upper plates 3 carrying friction rollers 20 which run in a guide groove 21 in the head 16 of the window frame. The plates 31 used at the lower outer corners of the sliding sashes are formed with downwardly extending pins $2^a$, which are inserted in holes 22 in the tops of the hollow members 23 (Figs. 13 and 14) slidable in the guide track 10 on the sill 9. A circular shoulder $3^a$ is provided around the pin $2^a$ to bear on the hollow member 23 and steady same in the guide track $10^a$.

The rollers 20 adapted to run in the guide groove 21, in the head 16 of the window frame, can be retained on the pivot pins $20^a$ on the plates 3 by said pins $20^a$ being countersunk and burred or spun over the rollers 20 (Fig. 22) or by means of caps held by screws on the pins $20^a$, or by screws having their heads recessed into the peripheries of the rollers 20 and their points entered in circular grooves in the pins $20^a$ or by means of cotter pins and washers inserted in and passed upon respectively the pivot pins $20^a$.

Oiling is provided for in the case of the countersunk and burred or spun pivot pins $20^a$, by holes $20^b$ (Fig. 22) opening through the tops and sides of the latter.

The plates 31 are provided at the outer ends of their outer edges with outwardly extending lugs or projections 5 (Figs. 21, 22) which when the sashes 1 are closed, contact with the lugs or projections 5 of adjacent and similarly formed and fitted plates 3, or against other members so that upon the sashes 1 being operated to open the window the lugs or projections 5 contact with each other and avoid wear by frictional contact between wooden parts or members. The provision of the lugs or projections 5 also ensure the plates 3 being fitted to the sashes with the pins $2^a$ and $20^a$ in correct alignment.

The hollow members 23 in which the pins $2^a$ of the lower plates 3 are inserted are preferably provided with sliding cross bolts 6 (Figs. 18, 19 and 20), adapted to take into the holes 11 in the channelled guide $10^a$ for the purpose of enabling the sashes to be set and retained in selected positions, the bolts 6 being provided with handles or finger pieces 8 capable of being turned down into recesses 12 in the hollow members 23 to permit the sashes 1 to pass thereover.

The end of the cross bolt 6 adapted to take into the hole 11, is made slightly eccentric to the body of the bolt, so that upon the latter being turned, said end is raised or lowered. Thus, with the finger piece 8 raised to the vertical position as shown in Fig. 20, the end of the bolt is lowered, and will take into the hole 11 when opposite same, under the action of the spring $6^a$, but with said finger piece 8 pressed down into the recess 12, as in Fig. 18, the end of the bolt 6 is raised to the position shown in Figure 19.

This eccentricity, although provided, is not of importance, as with the finger piece 8 pressed down in the recess 12, the bolt 6 is retained in its withdrawn or non-locking position by the stem of the finger piece engaging in the side opening from the cross slot in which said stem is movable, when vertical.

The cross bolts 6 are pressed by springs $6^a$ to engage in the holes 11 immediately they register with same when the handle or finger piece 8 is raised and in order that said handles or finger pieces 8 will not be damaged or interfere with the closing of the sashes 1, should said handles or finger pieces be left raised when closing the sashes, the handles or finger pieces 8 are each sloped or bevelled, as at $8^a$, towards the sash 1, adapted to pass thereover, so that upon the lower edge of the sash or rather the plate 3 recessed therein striking the raised handle or finger piece 8, the latter is turned down into its recess 12 as before mentioned. Also to facilitate the turning down action of the handles or finger pieces 8 the edges of the plates 3 adapted to contact therewith are rounded as at 30 (Fig. 21).

Where the lower outer corners of the sashes 1 swing inwards over raised guides formed by the metal strips 10 or $10^a$ upon the sashes being opened, they are rebated at 24 (Figs. 5 and 6) to clear said strips.

The provision of the rebates leaves openings in the sash 1 when the latter are closed, and in order to cover said openings, plates 25 shaped as shown are pivoted at $25^a$ to the outer sides of the sashes. These plates 25 which can be mounted on plates 26 recessed into the sashes 1 and shaped to clear the ends of the openings 24 normally hang against stops 27 to cover said openings, but upon the corner of the sash carrying said plates 25, 26 being swung inwards over the metal strip, the rounded corner $25^b$ of the plate 25 is forced by contact with the latter to rise up off its stop 27 and to pass over the metal strip. Upon the sash 1 being brought to its closed position, the plate 25 again drops and covers the end of the rebate 24.

The hinges used at 2 for hinging together the sashes comprising a pair thereof, are preferably provided with removable pins 18, each having a loop 39 (Figs. 10, 11, 15 and 16) to provide means for gripping and operating the sashes which are opened by pushing outwards the hinged together edges and closed by drawing the latter inwards by the aid of the looped pins. The hinges used at $2^b$ (Figs. 10, 11 and 12) can be provided with full loop handles $18^a$ instead of loops 39 to further facilitate opening and closing of the sashes. The meeting edges of sashes are rebated to fit together and make a weather tight joint when the sashes are closed.

The hinge pin 18 is made loose or is slidable and projects at both ends beyond the hinge a sufficient distance to enable said pin to be slid without leaving the latter. The pin 18 has the loop 39 formed to pass downwards and bear against the hinge to provide a stay for the upper end of the pin and when the hinge is used at the top of sashes, said pin 18 can be slid upwards to take into the head 16 of the window frame, and when used at the bottom of sashes it can be slid downwards to take into the window sill 9.

This hinge in addition to performing its ordinary function of hinging together the sashes 1, also provides a means of locking the latter closed, while the loop handle 39 facilitates the opening and closing of the sashes.

An alternative form of sash fastener can comprise a barrel bolt 13 (Fig. 17) adapted to be secured to a sash and formed with a loop handle $13^a$, attached to the bolt, the latter taking into the sill 9 when the sashes are closed. When this form of fastener is used, the loop handle $13^a$ also provides convenient means for gripping and operating the sashes.

What I do claim and desire to obtain by Letters Patent of the United States of America is:—

1. In a window having a pair of hinged together sashes, fittings with curved surfaces secured to the head and to the sill of the window frame, and adapted to be engaged by the sashes when the latter are brought to their closed positions for the purpose set forth, substantially as described and illustrated.

2. In a window having a pair of hinged together sashes according to claim 1, wherein the fitting used on the window sill is formed and secured so that its curved surface projects over the outer edge of the guide on the window sill, in which sash fittings operate, substantially as described and illustrated.

3. In a window having a pair of hinged together sashes, a sash containing a rebate in a corner adapted to swing over a raised guide on the window sill, when opening said sash, and a plate pivoted to said sash adapted to normally cover said opening when the sash is closed and to be moved up over said guide upon the sash being opened, substantially as described and illustrated.

4. In a window having a pair of hinged together sashes, a sash provided with a rebate and a pivoted plate as in claim 3, said plate being pivoted on a plate recessed into the sash and formed to clear the rebate, said recessed plate carrying a stop on which the pivoted plate normally rests, substantially as described and illustrated.

5. In a window having a pair of hinged together sashes, a sliding pivotal fitting for use at the corner of an outer member of a sash, comprising a plate recessed into the said sash, a guide in the window frame, a member slidable in the said guide, a projection extending from said plate and received in the said guide, the said guide having a hole disposed in the side thereof, and a catch fitted on the said member, and adapted for entry into the said hole when adjacent thereto.

6. In a window having a pair of sashes hinged together, a sliding pivotal fitting for use at the corner of an outer member of a sash, comprising a plate recessed into the said sash, a guide in the window frame, a member slidable in the said guide, a projection extending from said plate and received in the said guide, the said guide having a hole disposed in the side thereof, and a catch fitted on the said member, and adapted for entry into the said hole when adjacent thereto, the said catch comprising a spring biased and turnable bolt disposed transversely of said member.

7. In a window having a pair of sashes hinged together, a sliding pivotal fitting for use at the corner of an outer member of a sash, comprising a plate recessed into the said sash, a guide in the window frame, a member slidable in the said guide, a projection extending from said plate and received in the said guide, the said guide having a hole disposed in the side thereof, and a catch fitted on the said member, and adapted for entry into the said hole when adjacent thereto, a handle or finger piece on the bolt, and a bevelled edge on the bolt with which the sash engages, to firmly lock the same in place, the said sliding member having a recess for the reception of said handle or finger piece.

8. In a window having a pair of hinged together sashes, a sliding pivotal fitting for use at the corner of an outer member of a sash, comprising a plate recessed into said sash, a side extension or lug at the outer end of each plate for interlocking engagement with a corresponding lug on the plate of an adjacent sash, a projection extending from said plate, and a guide in the window frame in which the said projection enters and separates.

JOHN KELSEY.